Jan. 25, 1955     G. E. HANSEN     2,700,560
HOSE COUPLING WITH INTERLOCKING LUGS
Filed Feb. 3, 1951
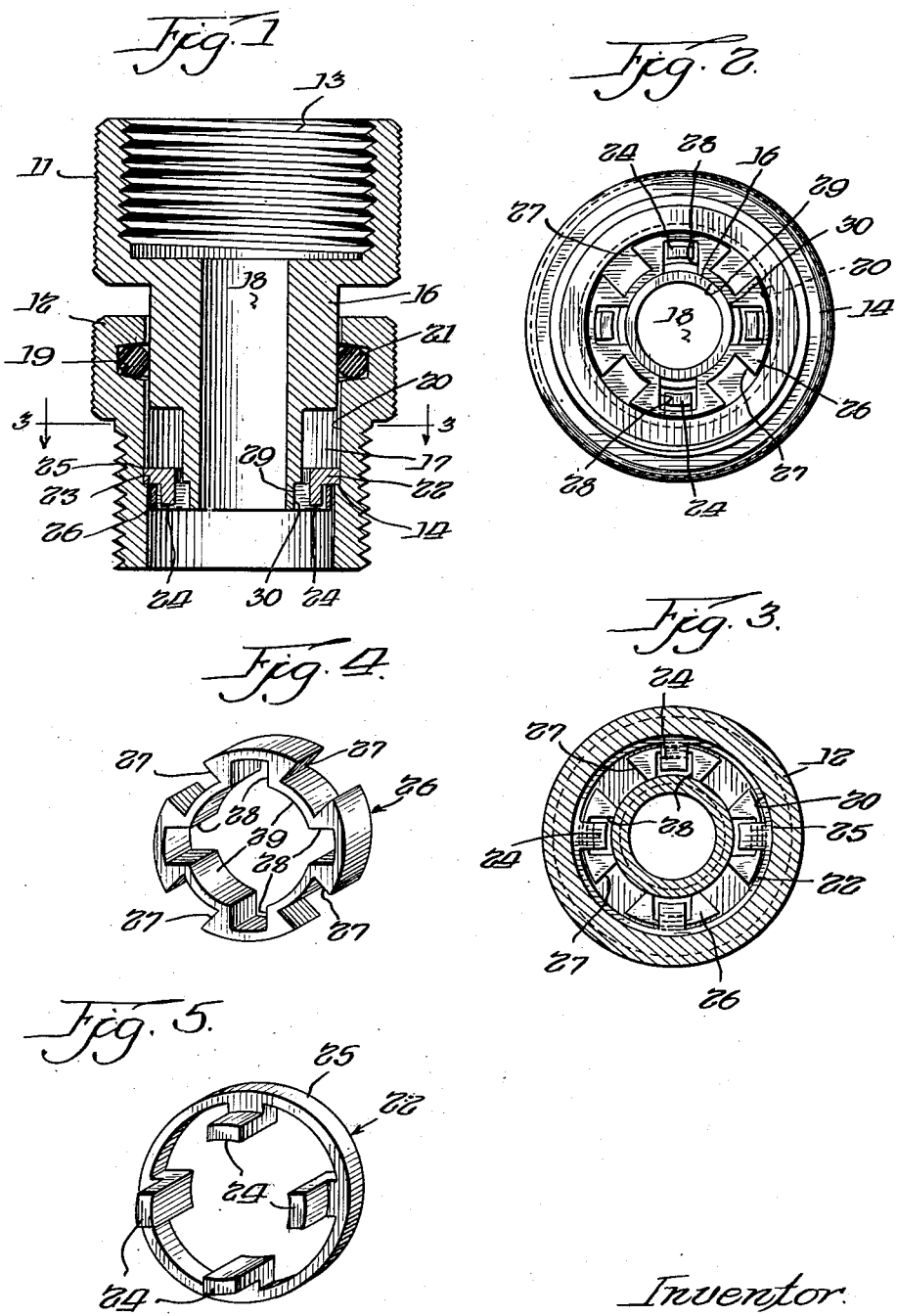
Inventor.
George E. Hansen.
By Joseph O. Lange
Atty.

United States Patent Office 2,700,560
Patented Jan. 25, 1955

2,700,560

HOSE COUPLING WITH INTERLOCKING LUGS

George E. Hansen, Chicago, Ill., assignor to Crane Co., Chicago, Ill., a corporation of Illinois Application February 3, 1951, Serial No. 209,274

1 Claim. (Cl. 285—175)

This invention pertains to a novel coupling, and, more particularly, it pertains to a pipe or hose coupling.

It is an object of this invention to provide a coupling which has what is termed a bayonet type of connection normally concealed from damaging exterior forces or media and provided in a more compact arrangement than presently available couplings.

Another object of this invention is to provide a hose coupling which in combination therewith employs an O-ring for effecting an effective fluid seal in the coupling.

Still another object is to provide a coupling which conceals the fluid sealing means, such as an O-ring, from exposure to the elements and also from exposure to forces which might otherwise deface the sealing means and thereby cause a leaky joint.

Still a further object is to provide a coupling which is easy to assemble avoiding the use of the usual compression gasket in effecting the fluid tight joint.

Other objects and advantages will become more readily apparent upon proceeding with the following description read in light of the accompanying drawings, in which Fig. 1 is a sectional view of an assembly of a preferred embodiment of this invention.

Fig. 2 is an end view of the device shown in Fig. 1.

Fig. 3 is a sectional view taken on the line 3—3 of Fig. 1.

Figs. 4 and 5 are perspective views of locking members shown in Fig. 1.

Similar reference numerals refer to similar parts throughout the several views.

As shown in Fig. 1, a preferred embodiment of this invention comprises two separable telescoping coupling members 11 and 12 which are of a circular configuration, as shown in Fig. 2, with a male member 11 and a female member 12. Members 11 and 12 are secured together in rotative and axial relation by novel means hereinafter described and referred to as a bayonet connection.

The members 11 and 12 are preferably threaded at their respective outer ends 13 and 14 for the purpose of threadedly engaging end sections of conduits, pipes, or hoses (not shown) and the like, and thereby provide for the conducting of fluid from one hose or conduit to the other. The coupling member 11 is shown in Fig. 1 to contain a reduced shank portion 16 which telescopes within an axial opening 17 of the member 12. Since shank 16 is provided with an axial opening 18 which registers with the opening 17, it will be apparent that a communicating or open fluid passage exists through the entire coupling.

An inner annular recess 19, in the wall of opening 17 of member 12, is provided to receive fluid sealing means, such as a resilient O-ring 21, and thus effect a fluid tight joint between members 11 and 12. It should be noted that the O-ring 21 serves to prevent the entrance of foreign matter into the coupling, and further that it is substantially concealed and protected against damage, such as physical defacing and also exposure to the sun, and is therefore available for longer service.

As further shown in Fig. 1, a retaining lug ring 22 is preferably press-fitted into the opening 17 to a position where the ring 22 abuts a shoulder 23 and thereby remains secure within the member 12 as the outer surface 25 of the ring 22 is snugly receivable relative to the wall 20 of chamber 17 (see Fig. 3). It will be noted, as shown in Fig. 5, that the ring 22 is provided with a plurality of integral projections, such as the fingers or lugs 24 spaced around the periphery of the ring as indicated to axially extend therefrom on a radius smaller than that of the ring body. Thus, in the assembly as shown in Fig. 1, the lugs 24 are suspended within member 12.

In referring to the mating coupling connector or bayonet connector element shown on member 11 in Fig. 1, a groove ring 26 is preferably press-fitted or otherwise secured onto an end portion of the member 11 as the inner periphery 29 of the ring 26 is also snugly mounted relative to the outer periphery 30 of member 11 (see Fig. 2). As shown in more detail in Fig. 4, the ring 26 comprises a plurality of external axial grooves or annularly arranged slots 27 and also with the internal axial grooves or slots 28. It should be noted that the grooves 27 and 28 each number the same as the lugs 24 and the grooves are, therefore, alternately spaced forty-five degrees apart.

In considering the assembling of the bayonet connection, the groove ring 26 is moved into the rear of lug ring 22 and the latter is shown in Fig. 5. Thus, the slots 27 receive lugs 24 which clear the ring 26 as the latter is passed completely through the ring 22, as it is of a smaller outer diameter than the inner diameter of the body of ring 22. With the lugs 24 clear of the ring 26, the two rings are relatively rotatable forty-five degrees in either direction, and then the rings 26 are withdrawn to provide for grooves 28 engaging with the lugs 24. Thus, it will be apparent that the rings 22 and 26 are locked in rotative position and axial position in one direction as the ring member 26 is located on the front of the ring 22 as the latter is shown in Fig. 5 and as assembled in Fig. 1.

As shown in the assembly views of Figs. 2 and 3, the bayonet connection is made as the lugs 24 of ring 22 are received within grooves 28 of ring 26 and rotating it 45 degrees. Disassembly of the joint is achieved by moving ring 22 forward, as seen in Fig. 3, rotating ring 22 in an opposite direction forty-five degrees and then moving it backward as the lugs 24 are free to move through the grooves 27 and outwardly or away from ring 26.

A reverse procedure of axial movement would disassemble the joint as it is viewed in Fig. 2.

By the employment of the above described invention, it will be apparent that a simple and inexpensive coupling has been devised with several operational advantages over presently known couplings. And, although this invention has been described in specific forms, it is susceptible to numerous changes and should, therefore, be limited only by the spirit thereof and the scope of the appended claim.

I claim:

A hose coupling or the like comprising a pair of telescoping members having axially aligned communicating flow passages therethrough, conduit connecting means on end disposed portions of each of said telescoping members, one of said telescoping members having an annular recess on the inner periphery thereof, fluid sealing means disposed within said recess substantially filling the same, the other of said telescoping members having a cylindrical projecting portion receivable within the said inner periphery of the other telescoping member, a plurality of spaced-apart axially extending angularly formed lugs mounted annularly to project inwardly on one of said telescoping members to project therefrom in spaced-apart relation to an inner peripheral portion of said latter named telescopic member, the other of said telescoping members being provided at an inner end portion thereof with a set of radially extending annularly arranged slots formed to receive the axially extending portion of said angularly formed lugs and having a second set of radially extending annularly arranged slots in the same transverse plane as the first named slots and spaced annularly therebetween to receive predeterminately said lugs of the other telescoping member upon predetermined relative rotation of said telescoping members, the said second named telescoping member having a reduced neck on the inner end of the cylindrical portion thereby defining the limit of axial movement of the first named telescoping member toward the other telescoping member, the outer peripheral portion of the said second named slots being defined by an arcuate wall portion fitting between the said lugs and the said telescoping member, the inner end limits of said second named slots engaging shoulder portions on the said lugs and restraining the said telescoping members against relative rotation upon predetermined axial movement therebetween of the telescoping members in a direction away from each other.

References Cited in the file of this patent

UNITED STATES PATENTS

| | | |
|---|---|---|
| 238,437 | Reynolds et al. | Mar. 1, 1881 |
| 797,796 | Devlin | Aug. 22, 1905 |
| 1,549,858 | Evans | Aug. 18, 1925 |
| 2,111,859 | Kennedy | Mar. 22, 1938 |